US008955463B2

(12) United States Patent
Makowski

(10) Patent No.: US 8,955,463 B2
(45) Date of Patent: Feb. 17, 2015

(54) STAIR SAFETY APPARATUS

(71) Applicant: Gary G. Makowski, Huntsville, AL (US)

(72) Inventor: Gary G. Makowski, Huntsville, AL (US)

( * ) Notice: Subject to any disclaimer, the term of this patent is extended or adjusted under 35 U.S.C. 154(b) by 168 days.

(21) Appl. No.: 13/833,863

(22) Filed: Mar. 15, 2013

(65) Prior Publication Data

US 2014/0262618 A1 Sep. 18, 2014

(51) Int. Cl.

| | |
|---|---|
| ***A62B 35/00*** | (2006.01) |
| ***B60R 22/00*** | (2006.01) |
| ***B60R 22/12*** | (2006.01) |

(52) U.S. Cl.

CPC .................................. *A62B 35/0068* (2013.01)

USPC .......................................................... 119/770

(58) Field of Classification Search

CPC .... A62B 35/00; A62B 35/0068; B60R 22/00; B60R 22/12

USPC .................................................. 119/770, 771

See application file for complete search history.

(56) References Cited

U.S. PATENT DOCUMENTS

| | | | | |
|---|---|---|---|---|
| 4,633,232 | A * | 12/1986 | Nelson et al. | 340/542 |
| 6,140,923 | A * | 10/2000 | Lam | 340/568.7 |
| 6,741,167 | B1 * | 5/2004 | Mulkey | 340/431 |
| 7,446,659 | B2 * | 11/2008 | Marsilio et al. | 340/568.1 |
| 2004/0172554 | A1 * | 9/2004 | Maloney | 713/200 |
| 2012/0103277 | A1 * | 5/2012 | Klein | 119/770 |
| 2014/0060454 | A1 * | 3/2014 | Lash | 119/770 |

* cited by examiner

*Primary Examiner* — Monica Williams

(74) *Attorney, Agent, or Firm* — George P. Kobler; Lanier Ford Shaver & Payne P.C.

(57) ABSTRACT

A stair safety apparatus includes a wrist with an elastic cord attaché at one end to said band. A bar member attached by one end to a second end of the elastic cord. The bar member is of a length sufficient to allow the bar member to become wedged between a wall-mounted stair rail and a wall.

2 Claims, 4 Drawing Sheets

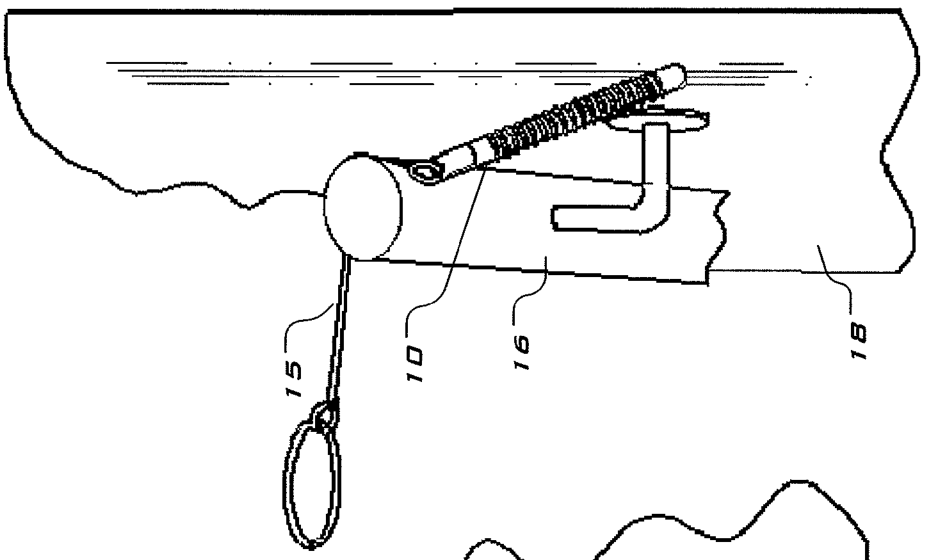
FIG. 4
FIG. 3
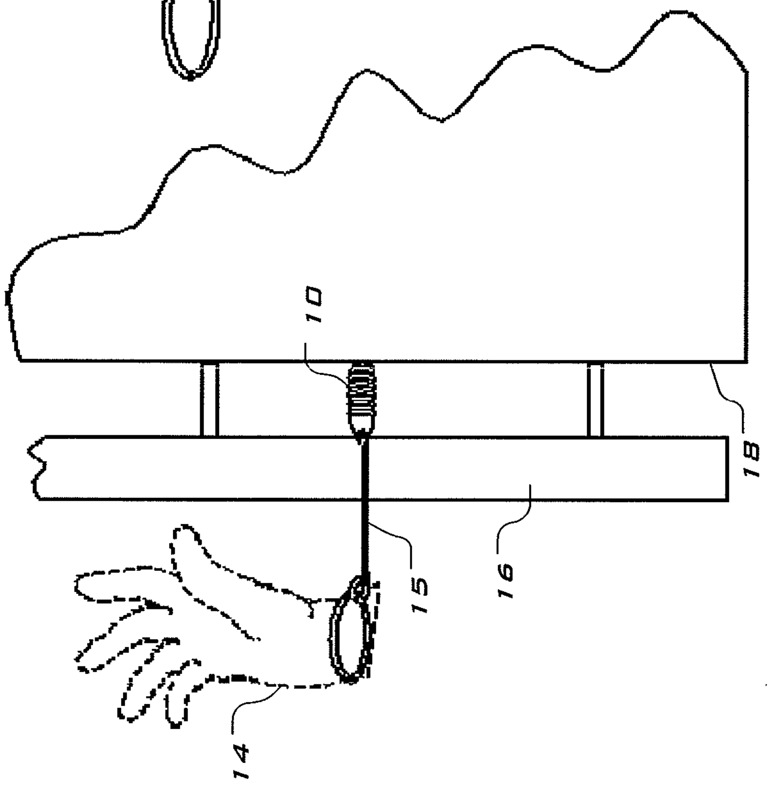

STAIR SAFETY APPARATUS

BRIEF DESCRIPTION OF THE DRAWINGS

FIG. 3 is an overhead view of the stair safety apparatus in use;

FIG. 4 is an oblique perspective view of the illustration of FIG. 3;

DETAILED DESCRIPTION

The various embodiments of the present invention and their advantages are best understood by referring to FIGS. 1 through 7 of the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

Figure 1:
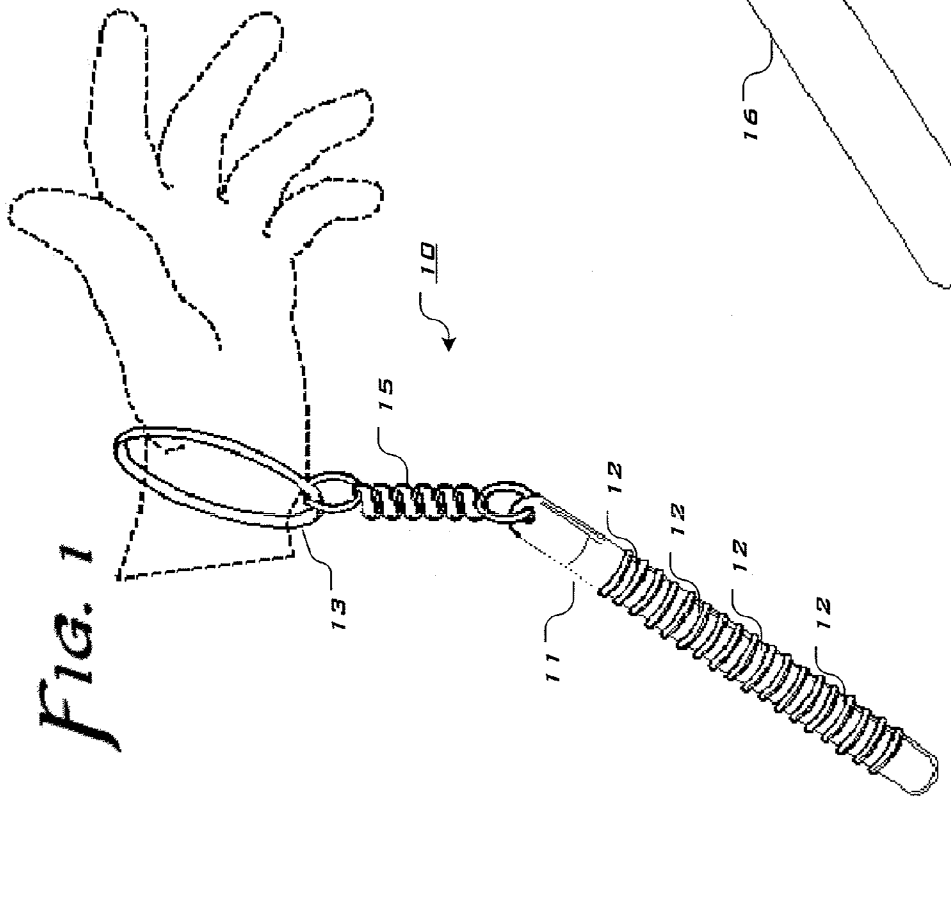
FIG. 1 illustrates an exemplary stair safety apparatus.

FIG. 1 depicts an exemplary stair safety apparatus 10 comprising a bar member 11, a wrist band 13, and an elastic or stretchable cord 15 connecting the bar member 11 and the wrist band 13 so the apparatus is worn around a user's wrist. The bar member 11 comprises a rigid core with an outer surface of a high friction material, for example, rubber or similar polymeric substance. Preferably, the outer surface further comprises a plurality of circumferential ribs 12 that lay roughly perpendicular to the longitudinal axis of the bar member 11. The cord 15 may be a helical stretch cord, as depicted, or may be any suitable elastic line.

Figure 2:
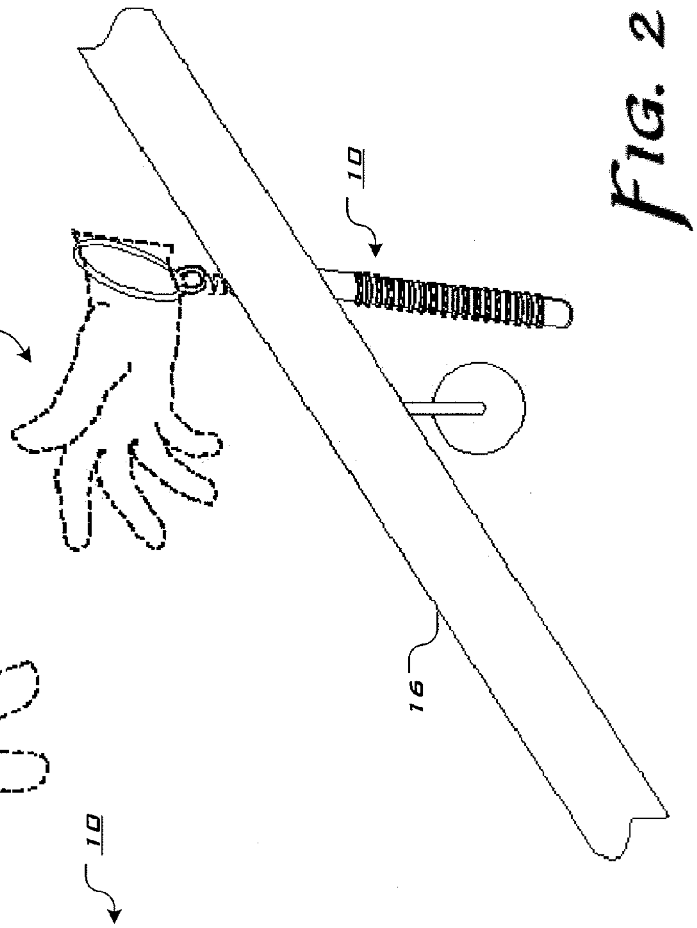
FIG. 2 illustrates a possible use for the exemplary stair safety apparatus.

FIGS. 2 through 4 illustrate the use of the stair safety apparatus 10 where the apparatus 10, worn by a user 14, is suspended between a stair rail 16 and the wall 18 to which the stair rail is mounted. If a user falls as he or she transits the stair way, the bar member 11 becomes wedged between the wall and the stair rail (FIG. 4), and the cord is pulled tight by the weight of the user. The friction between the outer surface of the bar member 11 and the wall helps to prevent the bar member 11 from disengaging from is wedged position. It will be appreciated that the bar member 11 should be long enough to engage both the wall and the stair rail, and the cord 15 should be long enough, in a stretched position, to prevent a user from toppling when a stumble occurs.

Figure 6A:
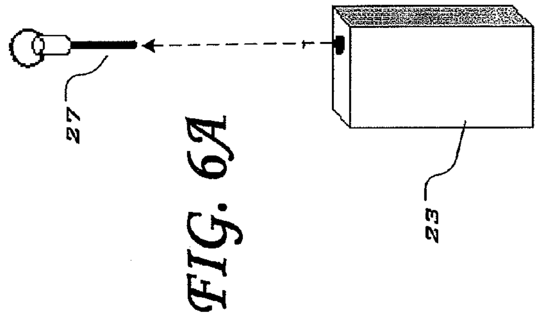
FIGS. 6A & B depicts use of one possible alarm device for use with the stair safety apparatus of FIG. 5.
Figure 6B:
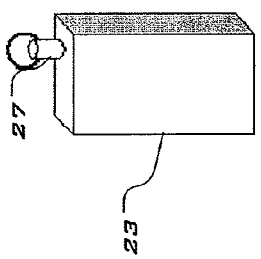
Figure 5:
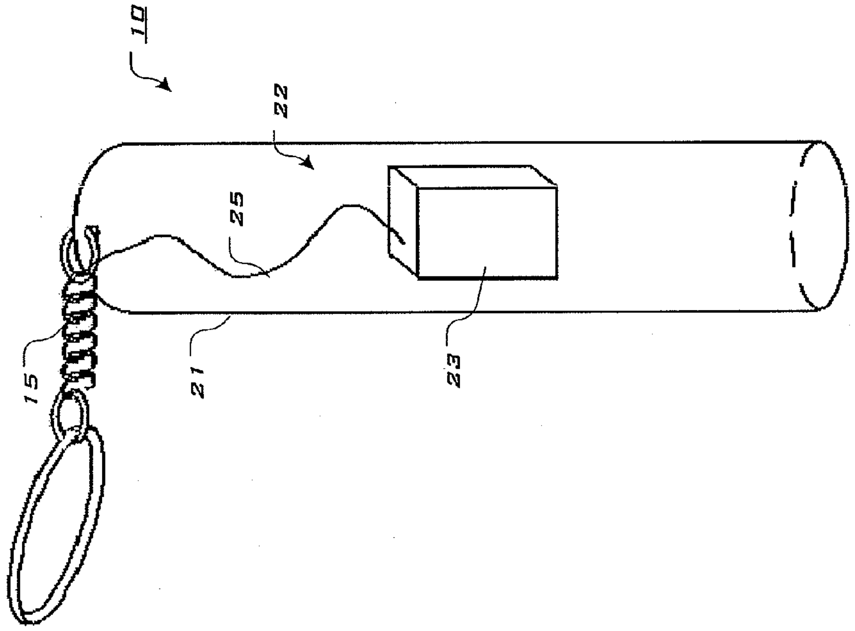
FIG. 5 illustrates a second exemplary embodiment of the stair safety apparatus.

With reference now to FIG. 5, an embodiment of the stair safety apparatus includes a hollow bar member 21 defining a chamber 22 in which is retained an alarm device 23. The alarm device 23 may be connected to a line 25 having an end attached to the cord 15. When a user falls and the cord 15 is pulled tight, the line 25 is also pulled and triggering activation of the alarm device 23. An alai device 23 suitable for use in this embodiment is exemplified by the personal keychain alarm device Model No. 51208 offered by General Electric Co. As shown in FIGS. 6A & 6B, such an alarm device 23 may include a pin 27 attached to the line 25, which is configured to activate an audible alarm when removed from the alarm device 23, which occurs when the line is pulled along with the cord 15 when a user falls on the stairs as described above.

Figure 7B:
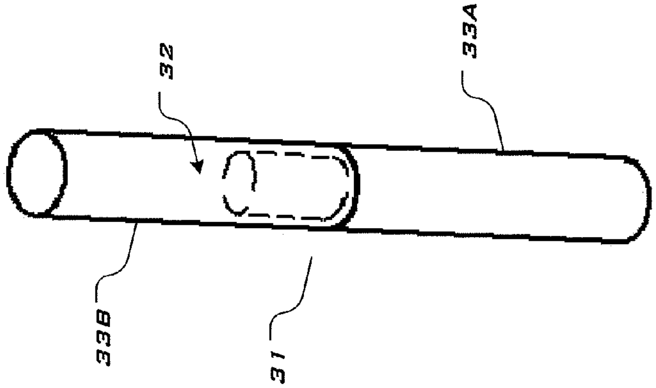
FIGS. 7A & 7B show a further exemplary embodiment of the stair safety apparatus.
Figure 7A:
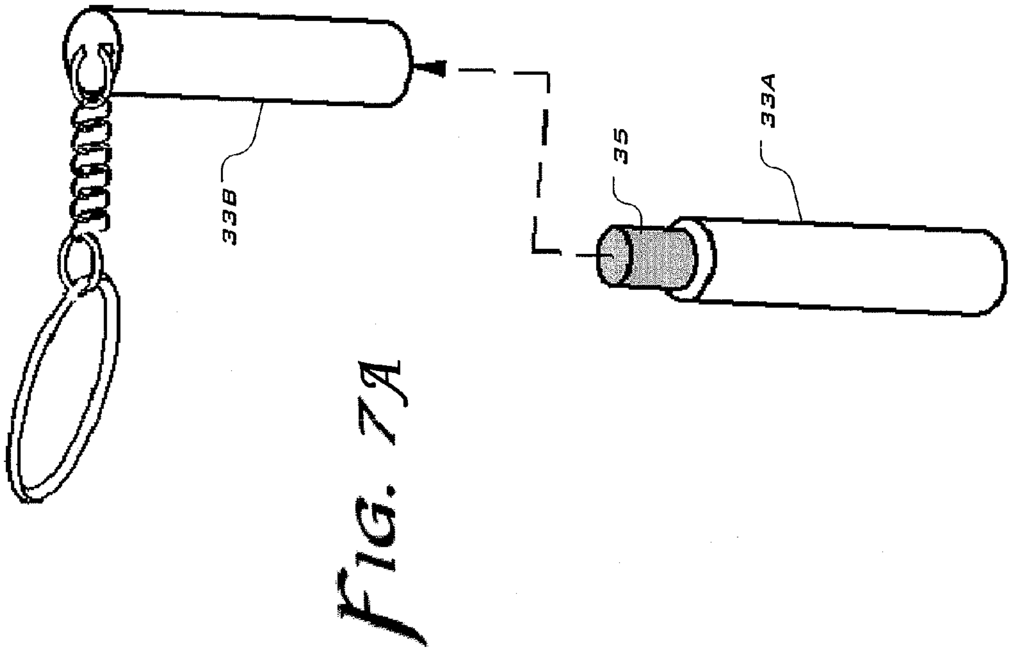

In another embodiment, shown with reference to FIGS. 7A and 7B, the bar member 31 comprises two pieces 33*a, b*, wherein a first piece 33*a* is formed to include a boss 35. The second piece 33*b* is formed with a chamber 32 for receiving the boss 35. In this way, the bar member 31 may be separated into pieces for convenient storage and re-attached for use.

As described above and shown in the associated drawings, the present invention comprises a stair safety apparatus. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A wrist band comprising:

a band to be worn around a wearer's wrist;

an elastic cord attached at one end to said band; and a bar member attached by one end thereof to a second end of said elastic cord, said bar member being an elongated member having a length sufficient to allow the bar member to become wedged between a wall-mounted stair rail and the wall to which the rail is mounted, said bar member comprising a plurality of circumferential ribs and wherein said bar member is hollow and defines a chamber and further comprises an alarm device having a removable pin and configured to activate an alarm when said pin is removed therefrom, said pin attached to said elastic cord such that when said cord is stretched, said pin is removed from said alarm device.

2. The wrist band of claim 1, wherein said bar member comprises first and second portions that are detachable from one another, said first portion comprising a boss extending from an end of said first portion, and said second portion comprising a hollow chamber dimensioned to removably receive said boss.

* * * * *